(12) United States Patent
Isono et al.

(10) Patent No.: US 7,209,157 B2
(45) Date of Patent: Apr. 24, 2007

(54) IMAGE RECORDER

(75) Inventors: Koichi Isono, Kyoto (JP); Makoto Hirosawa, Kyoto (JP); Ichiro Watanabe, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 345 days.

(21) Appl. No.: 10/867,730

(22) Filed: Jun. 16, 2004

(65) Prior Publication Data
US 2005/0001894 A1    Jan. 6, 2005

(30) Foreign Application Priority Data
Jun. 20, 2003    (JP)    ............... 2003-176357

(51) Int. Cl.
*B41J 2/435*    (2006.01)
(52) U.S. Cl. .................................... 347/227
(58) Field of Classification Search ........ 347/224–225, 347/227; 219/121.65, 121.67, 121.6, 137.41; 372/109; 55/431–432
See application file for complete search history.

(56) References Cited

U.S. PATENT DOCUMENTS 4,288,678 A * 9/1981 La Rocca .............. 219/121.65
4,469,430 A    9/1984 Terashima
4,719,641 A * 1/1988 Muller et al. ............... 372/109
5,906,760 A * 5/1999 Robb et al. ............ 219/121.67

FOREIGN PATENT DOCUMENTS

| JP | 7-89038 | 4/1995 |
| JP | 9-131903 | 5/1997 |
| JP | 2000-56400 | 2/2000 |
| JP | 2000056400 A * | 2/2000 |
| JP | 2000-135587 | 5/2000 |

* cited by examiner

*Primary Examiner*—Hai Pham
(74) *Attorney, Agent, or Firm*—McDermott Will & Emery LLP

(57) ABSTRACT

A plate fixed to a recording drum is irradiated with a laser beam emitted from an objective lens of a recording head, to generate gas. The recording head has a gas diffusion/suction unit forming an air stream in front of the objective lens. Further, a second suction unit elongated along the rotational axis of the recording drum is arranged between a transport unit supplying the plate to the recording drum and the recording head. Thus, it is possible to prevent the gas not only from contaminating the objective lens but also from diffusing in a housing following rotation of the recording drum. Consequently, an image recorder employing a photosensitive material generating gas in reaction to heat resulting from the laser beam emitted from the recording head can minimize contamination of the recording head, the transport unit etc. arranged in the housing of the apparatus with the gas.

9 Claims, 8 Drawing Sheets

IMAGE RECORDER

BACKGROUND OF THE INVENTION

1. Field of the Invention

The present invention relates to an image recorder for fixing an image recording material to the outer peripheral surface of a recording drum and rotating the recording drum while moving a recording head in a subscanning direction parallel to the rotational axis of the recording drum and applying a laser beam thereby recording a two-dimensional image on the image recording material. More particularly, the present invention relates to an image recorder recording an image on an image recording material generating gas by thermal reaction. It is assumed that the term "gas" includes not only pure gas constituents such as sublimates generated from the image recording material but also a gas mixture of solid components such as dust and ash.

2. Description of the Background Art

In an image recorder employing an image recording material generating gas, the gas may adhere to an objective lens of a recording head or the like to tarnish the surface of the objective lens and deteriorate the quality of an image formed on the image recording material. In order to solve this problem, Japanese Patent Application Laying-Open Gazette No. 2000-56400 discloses a technique of diffusing the aforementioned gas by producing an air stream intersecting with a laser beam emitted from a recording head for preventing the gas from adhering to an objective lens of the recording head.

FIG. 8 is an explanatory diagram schematically showing a recording drum 101 and a recording head 108 in a conventional image recorder. A plate 100 employed as an image recording material is fixed to the outer peripheral surface of the recording drum 101 with a front clamp 102 and a rear clamp 103. The recording head 108 applies a laser beam to the plate 100 for recording images. This recording head 108 comprises a gas diffusion/suction unit 180. The gas diffusion/suction unit 180 injects clean air from an air injection port 182 and sucks the atmosphere from a gas suction port 183 thereby forming an air curtain in front of an objective lens 186 for preventing the gas from adhering to the objective lens 186.

The image recorder shown in FIG. 8 diffuses gas etc. generated from the plate 100 with the air injected from the air injection port 182 and sucks the atmosphere containing the diffused gas from the gas suction port 183. Thus, the image recorder can suck most of the gas generated from the plate 100 through the suction port 183.

In recent years, however, a recording material generating a large quantity of gas has been employed due to development of the so-called processless printing plates requiring no development or the like after image recording, and it is apprehended that the image recorder cannot completely suck the entire gas through the aforementioned suction port 183.

In order to improve gas collection efficiency, the area of the gas suction port 183 of the gas diffusion/suction unit 180 may be enlarged. If the gas diffusion/suction unit 180 fixed to the recording head 108 is enlarged in scale, however, the recording head 108 may be hindered from moving in a subscanning direction.

SUMMARY OF THE INVENTION

The present invention is directed to an image recorder applying a laser beam to an image recording material thereby recording a two-dimensional image on this image recording material.

According to the present invention, the image recorder comprises a recording drum having an outer peripheral surface to which the image recording material is fixed, a rotation element rotating the recording drum, a recording head having a laser beam source emitting a laser beam and an objective lens applying the laser beam to the image recording material fixed to the outer peripheral surface of the recording drum, a recording head moving element moving the recording head in a subscanning direction parallel to the rotational axis of the recording drum, a gas injection element moving in the subscanning direction along with the recording head for diffusing gas generated from the image recording material irradiated with the laser beam by injecting prescribed gas in the vicinity of the objective lens, a first suction element, moving in the subscanning direction along with the recording head, located downstream beyond the gas injection element in relation to the rotational direction of the recording drum for sucking the gas diffused by the gas injection element and a second suction element located downstream beyond the first suction element in relation to the rotational direction of the recording drum for sucking the gas diffused by the gas injection element over the total width of an image recording area of the image recording material in the subscanning direction.

The gas generated from the image recording material is diffused by the gas injection element and thereafter sucked by the first suction element, not to contaminate the objective lens of the recording head. Further, the second suction element sucking the gas over the total width of the image recording area can suck the part of the gas not sucked by the first suction element. Thus, the image recorder can be prevented from contamination with the gas.

Accordingly, an object of the present invention is to provide an image recorder improved in gas collectability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
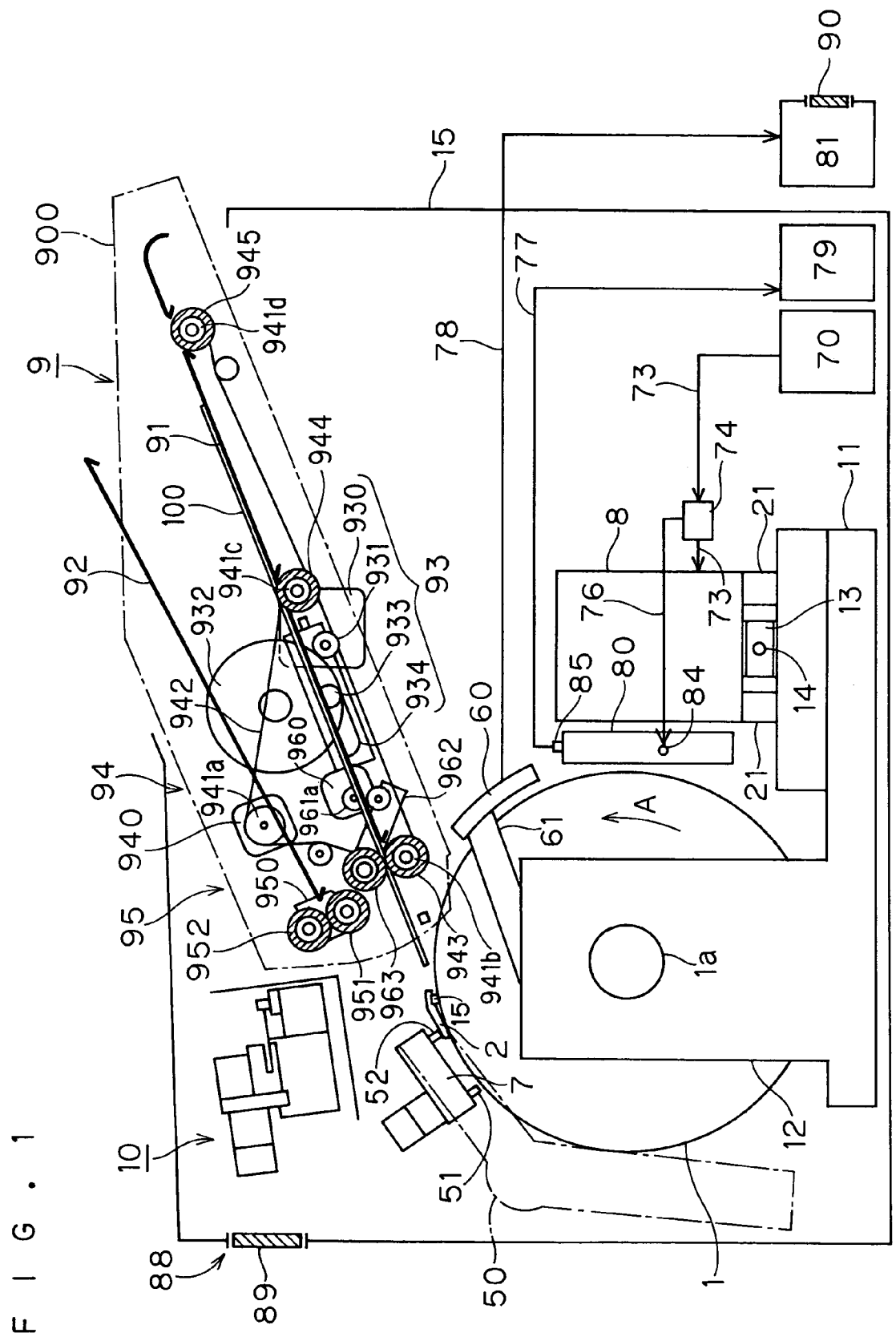
FIG. 1 is a schematic side elevational view of an image recorder according to an embodiment of the present invention.

FIG. 1 is a schematic side elevational view of an image recorder according to an embodiment of the present invention.

This image recorder comprises a cylindrical recording drum 1, a recording head 8, a transport unit 9, a punch 10, a base part 11, an air supply pump 70, a first exhaust pump 79 and a pair of clamp arms 50 in a housing 15 partially formed with an air inlet 88. A filter 89 is disengageably engaged in the air inlet 88 of the housing 15.

The recording drum 1 is arranged to be rotatable about a rotational axis 1a with respect to a bearing 12 arranged on a base 11 in the housing 15 of the image recorder. A motor (not shown) rotates the recording drum 1 along arrow A. An aluminum plate 100 is mounted on the outer peripheral surface of the recording drum 1 as an image recording material. A plurality of front clamps 2 arranged on the outer peripheral surface of the recording drum 1 and a plurality of rear clamps 3 (not shown in FIG. 1) detachable from the outer peripheral surface of the recording drum 1 fix first and second ends of the plate 100 to the outer peripheral surface of the recording drum 1 respectively.

The recording head 8 is arranged on a pair of rails 21 in front of the recording drum 1. The recording head 8 is fitted with a feed shaft 14 rotated by a motor 13, to be movable along the direction of the rotational axis 1 a of the recording drum 1.

As shown in FIG. 1, the image recorder comprises the pair of clamp arms 50. A driving bar 7 is mounted between the pair of clamp arms 50. The pair of clamp arms 50 are rockable in directions for approaching and separating the driving bar 7 to and from the recording drum 1 respectively. The driving bar 7 is provided with a driving pin 51 for fixing and detaching the rear clamps 3 to and from the recording drum 1 and a release pin 52 for releasing the front clamps 2 when mounting the plate 100.

As shown in FIG. 1, the transport unit 9 is rockably arranged above the recording drum 1. The transport unit 9 has first and second transport paths 91 and 92 for introducing and discharging the plate 100 respectively. In order to introduce the plate 100, the transport unit 9 supplies the plate 100 onto the recording drum 1 through the first transport path 91. In order to discharge the plate 100, on the other hand, the transport unit 9 discharges the plate 100 detached from the recording drum 1 through the second transport path 92.

A first transport mechanism 94 has a transport roller driving motor 940, a plurality of transport rollers 943, 944 and 945, a pulley 941a coupled to the transport roller driving motor 940, pulleys 941b, 941c and 941d coupled to the transport rollers 943, 944 and 945 respectively, a belt 942 extended along the pulleys 941a, 941b, 941c and 941d, a nip roller 963 arranged oppositely to the transport roller 943, a rock member 962 mounted with the nip roller 963 on its forward end and a nip roller driving motor 960 rocking the rock member 962 for approaching/separating the nip roller 963 to/from the transport roller 943.

A second transport mechanism 95 has a transport roller driving motor 950 and transport rollers 951 and 952 driven by this transport roller driving motor 950.

The transport path switching mechanism 93 is constituted of a transport path switching motor 930, a gear 931, a cam gear 932, a cam follower 933 and a cam follower guide 934. The transport switching motor 930 is mounted with the gear 931 meshing with the cam gear 932, to which the cam follower 933 is fixed. The cam follower 933 engages with the cam follower guide 934. The cam follower guide 934 is fixed to a unit body part 900 of the transport unit 9, and a prescribed support member supports the unit body part 900 to be rockable about the rear portion with respect to the housing 15.

Upon rotation of the transport path switching motor 930, the cam gear 932 rotates through the gear 931 for vertically moving the cam follower guide 934 through the cam follower 933 fixed to the cam gear 932. Thus, the transport unit 9 rocks between positions opposite to the punch 10 and the drum 1 respectively.

The punch 10 is arranged in front of the transport unit 9, in order to form a recording drum index hole and a printer index hole in the plate 100. The plate 100 is supplied to the punch 10 through the first transport path 91 of the transport unit 9 before the same is supplied onto the recording drum 1, so that the recording drum index hole and the printer index hole are formed on the forward end thereof. A registration pin 15 provided on the outer peripheral surface of the recording drum 1 engages in the recording drum index hole of the plate 100.

The recording head 8 comprises the laser beam source 30 (not shown in FIG. 1) therein. This laser beam source 30 is controlled on the basis of an image signal for emitting a laser beam toward the plate 100 fixed to the outer peripheral surface of the recording drum 1. The motor 13 successively moves the recording head 8 in a direction (subscanning direction) parallel to the rotational axis 1a of the recording drum 1 in synchronization with the rotation of the recording drum 1, thereby forming a desired two-dimensional image on the plate 100 fixed to the recording drum 1.

The plate 100 used in this image recorder is a thermal plate changed in thermal mode through irradiation with a high-power laser beam, for example. This plate 100 generates gas due to the laser beam applied thereto. It is undesirable that this gas adheres to the members such as the recording head 8, the transport unit 9 and the punch 10 arranged in the housing 15, in view of maintenance/management of the image recorder.

In order to prevent the gas from adhering to the aforementioned members, a gas diffusion/suction unit 80 is arranged between the recording head 8 and the recording drum 1 while a long second suction unit 60 extending along the rotational axis 1a of the recording drum 1 is arranged between the recording head 8 and the transport unit 9 in this image recorder. The second suction unit 60, having a suction port substantially along the outer peripheral surface of the recording drum 1, is fixed to the bearing portion 12 by a pair of support arms 61.

The air supply pump 70 is a member cleaning air outside the housing 15 of the image recorder through a prescribed filter and feeding the same into an air supply pipe 73. The air supply pipe 73 communicating with the recording head 8 pressurizes the recording head 8 by feeding the air. Thus, the outside air hardly flows into the recording head 8. The air supply pipe 73 is coupled to a second air supply pipe 76 through a branch pipe 74. The second air supply pipe 76 is coupled to the gas diffusion/suction unit 80 through an air supply port 84, for supplying air to the gas diffusion/suction unit 80 through this air supply port 84.

The first exhaust pump 79 exhausts the gas diffusion/suction unit 80 through a gas recovery port 85 for cleaning gas through a prescribed filter and discharging the same from the housing 15.

Figure 2:
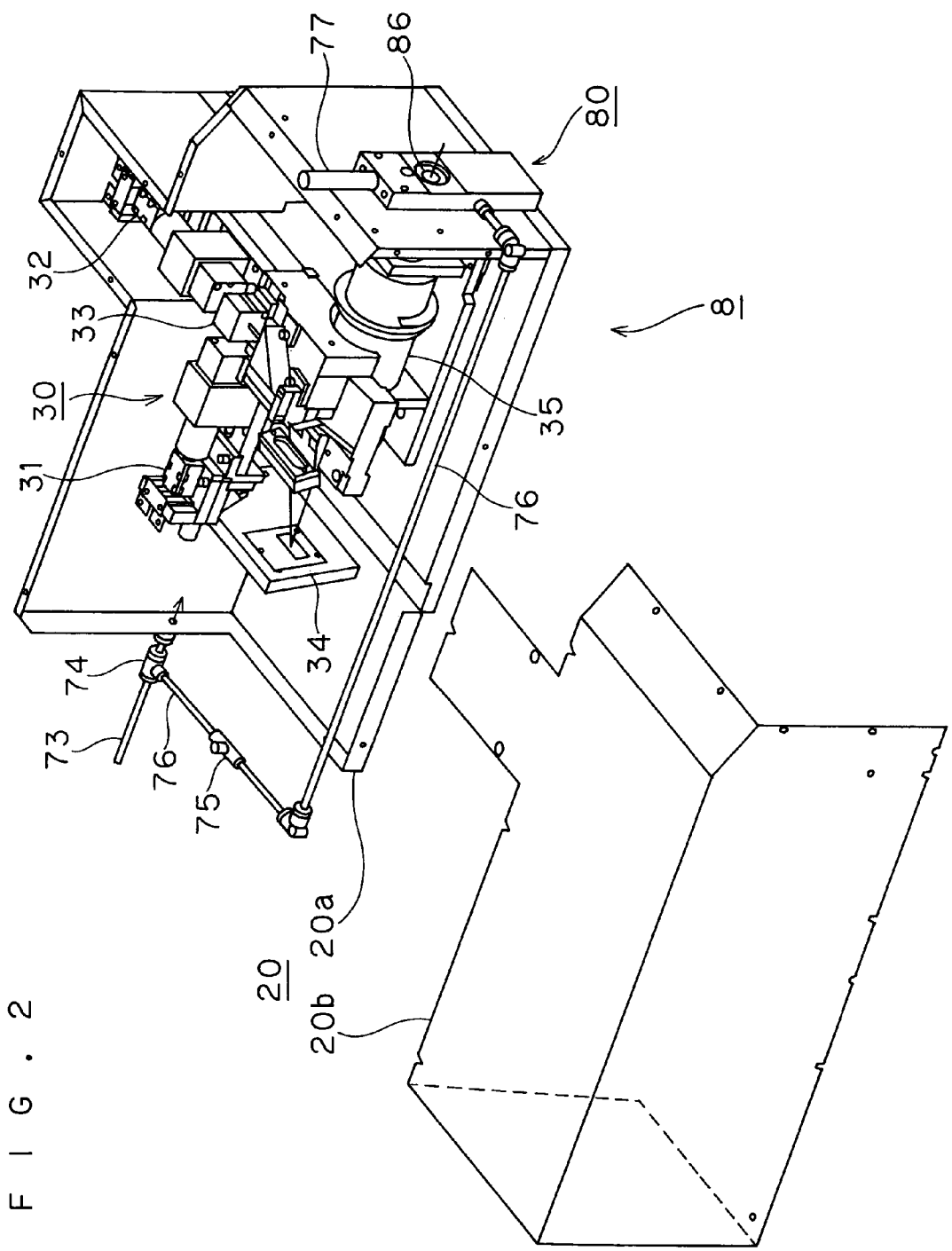
FIG. 2 is an exploded perspective view of a recording head employed in the image recorder shown in FIG. 1.

FIG. 2 is a perspective view for illustrating the recording head 8 in detail. The recording head 8 has a case 20, the laser beam source 30 arranged in the case 20 and the gas diffusion/suction unit 80 mounted on the front surface of the case 20.

The case 20 is a closed container consisting of a lower case 20a and an upper case 20b. The lower and upper cases 20a and 20b are so combined with each other as to cut off the laser beam source 30 from the atmosphere in the housing 15 of the image recorder. A laser beam emission hole 87 (see FIG. 4) is formed on a surface of the lower case 20a opposite to the recording drum 1.

The laser beam source 30 is arranged on the bottom surface of the lower case 20a. This laser beam source 30 has two laser units 31 and 32, a synthesizer 33 synthesizing two laser beams emitted from the laser units 31 and 32 respectively, a modulator 34 selectively reflecting the synthesized laser beam in response to the image signal and an imaging optical system 35 focusing the laser beam reflected by the modulator 34 on the plate 100 through the laser beam emission hole 87 and an objective lens 86.

The air supply pipe 73 supplies air to the recording head 8. This air supply pipe 73 is coupled to the recording head 8 on the rear surface thereof. The air supply pipe 73 is further coupled to the second air supply pipe 76 by the branch pipe 74 on an intermediate position. The second air supply pipe 76 supplies air to the gas diffusion/suction unit 80 arranged in front of the recording head 8. A regulating valve 75 regulates the quantity of air supplied to the gas diffusion/suction unit 80.

Figure 3:
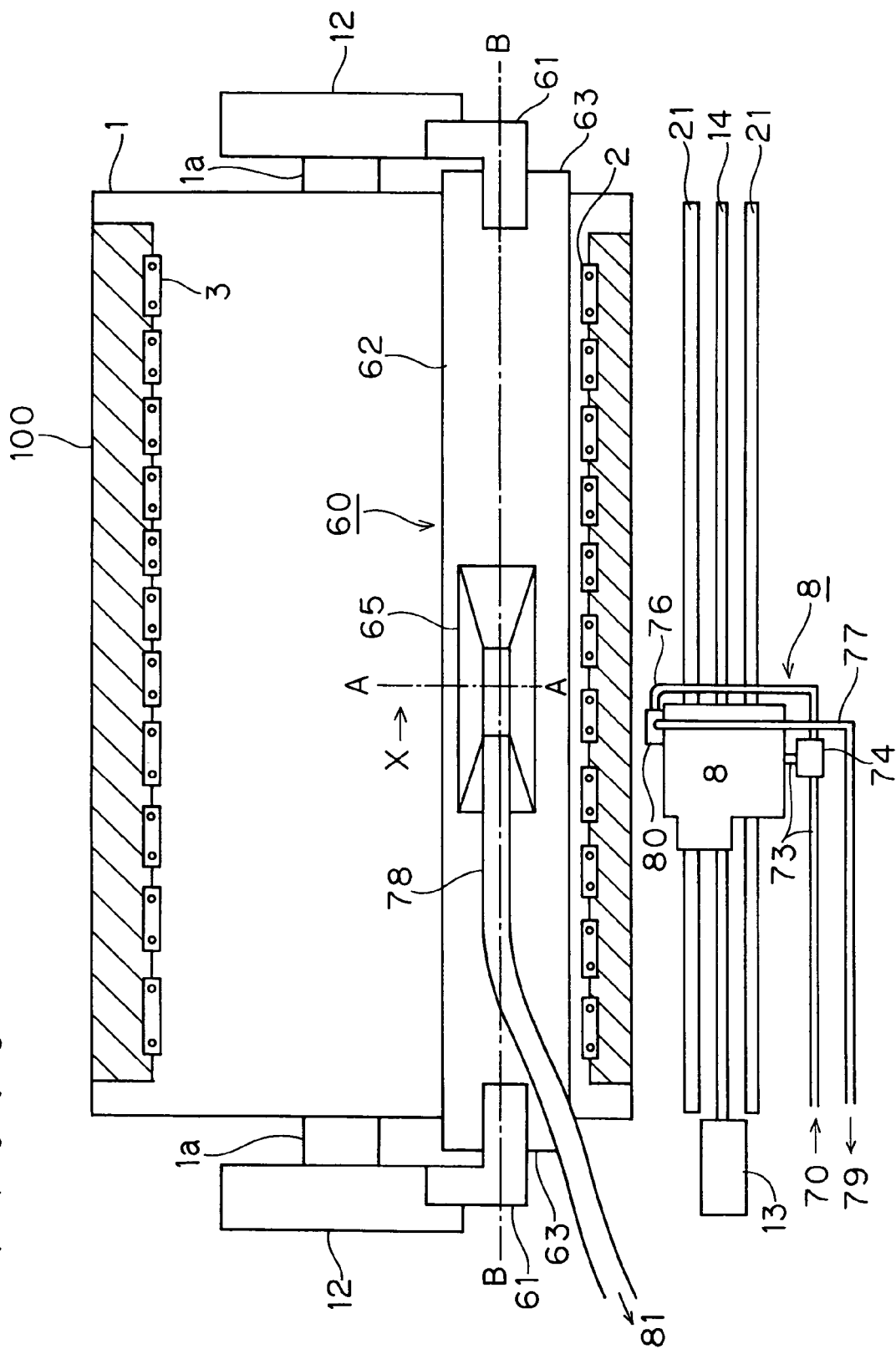
FIG. 3 is a top plan view of a recording drum, a recording head and a second suction unit in the image recorder shown in FIG. 1.
Figure 4:
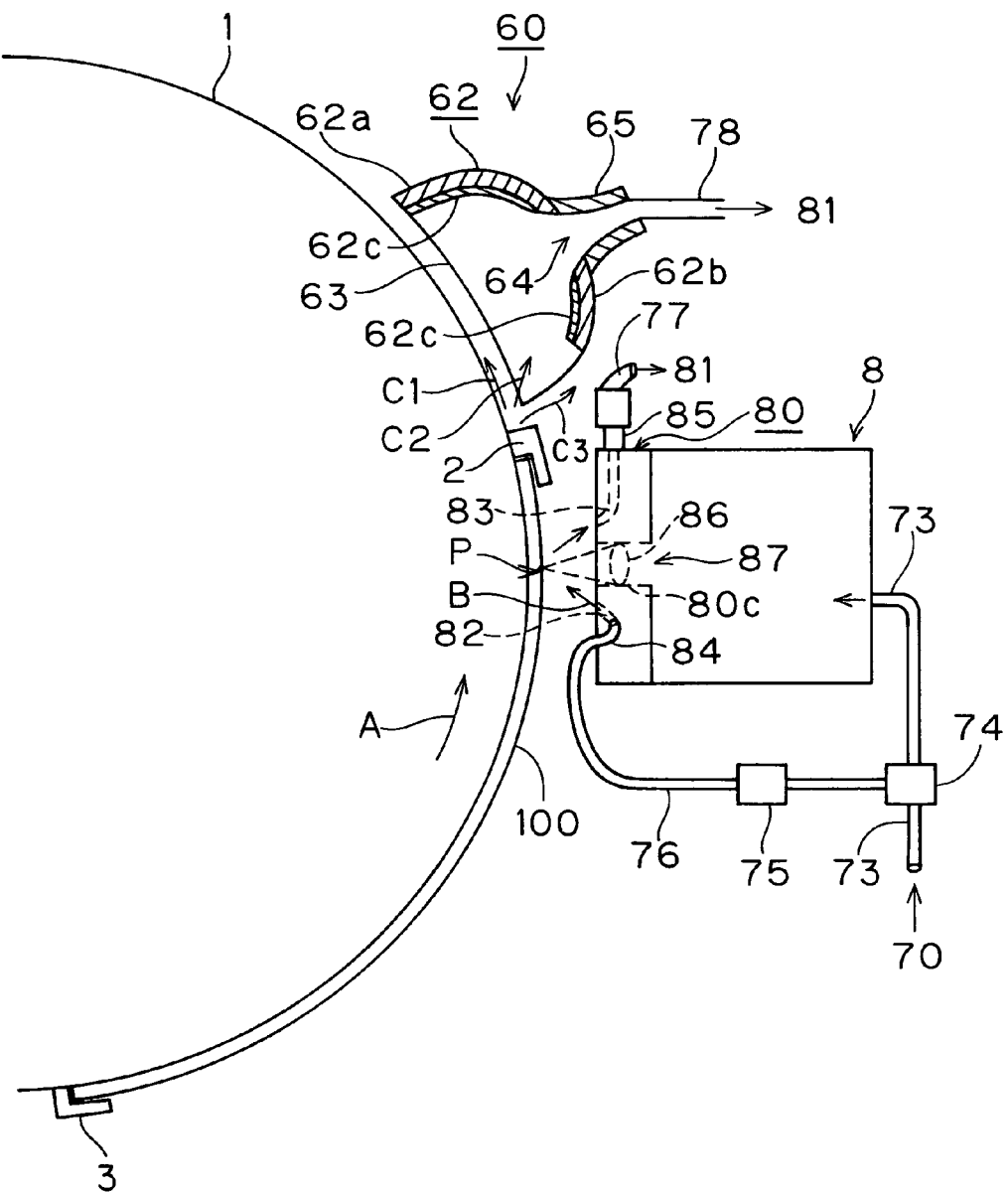
FIG. 4 is a conceptual diagram illustrating an air stream around the recording head in the image recorder shown in FIG. 1.
Figure 5:
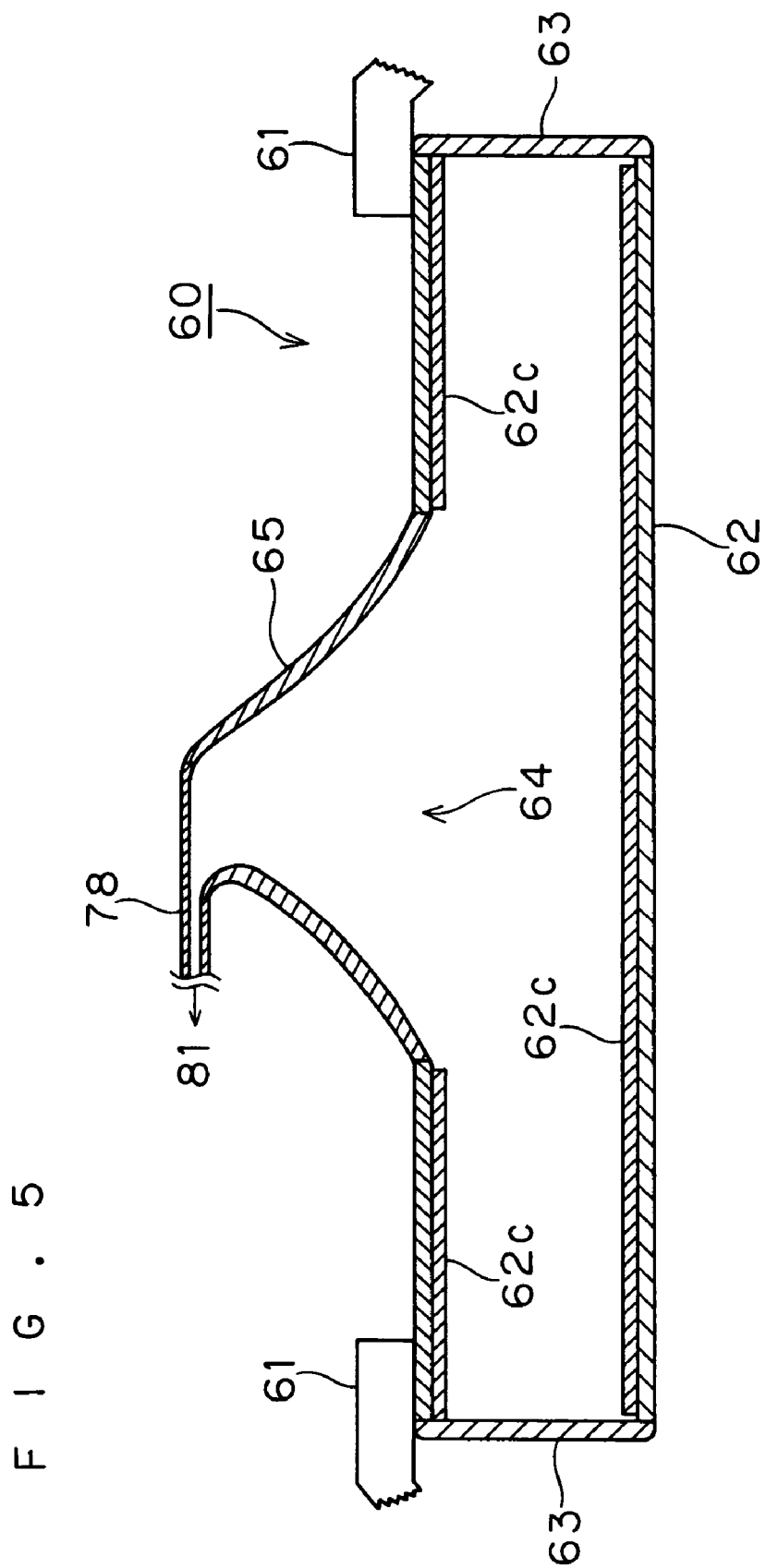
FIG. 5 is a sectional view of the second suction unit.

The second suction unit 60 is now described. FIG. 3 is a top plan view showing the recording drum 1, the second suction unit 60, the recording head 8 and the like. FIG. 4 is a side elevational view of a portion around the recording head 8 including a section of the second suction unit 60 taken along the line A—A in FIG. 3. FIG. 5 is a sectional view, taken along the line B—B in FIG. 2, showing the second suction unit 60 as viewed from the recording head 8.

As shown in FIGS. 3 to 5, the second suction unit 60 has a long second suction unit body 62 extending along the rotational axis 1a of the recording drum 1 and having a partially cylindrical form, a pair of side plates 63 blocking the side surfaces of the second suction unit body 62, an opening 64, elongated along the rotational axis 1a of the recording drum 1, formed on the upper surface of the second suction unit body 62 and a reducing part 65 coupled to the opening 64.

As shown in FIG. 3, the length of the second suction unit 60 along the rotational axis 1a of the recording drum 1 is larger than the length of the recording drum 1 in the same direction. Therefore, this length is larger than the width of the plate 100 mounted on the recording drum 1, as a matter of course. Further, the length of the second suction unit 60 is larger than the movable range of the recording head 8. Therefore, the second suction unit 60 can be located on a position opposite to the gas generated from the plate 100 irradiated with the laser beam emitted from the recording head 8 regardless of the location of the recording head 8 in the subscanning direction. The second suction unit 60, having the length larger than that of the recording drum 1 along the rotational axis 1a thereof in this embodiment, may have a length at least larger than the movable range of the recording head 8, i.e., an image recording area of the recording head 8.

As shown in FIG. 4, the second suction unit body 62 is in the partially cylindrical form having two bowed portions 62a and 62b. The lower bowed portion 62b (closer to the recording head 8), having an end extending only toward a position separating from the outer peripheral surface of the recording drum 1 to some extent as compared with the upper bowed portion 62a, can readily suck the gas generated from the plate 100 irradiated with the laser beam emitted from the recording head 8 into the second suction unit body 62. The upper bowed portion 62a has a lower end approaching the outer peripheral surface of the recording drum 1 to approximate the upper surface of the front clamps 2 or the rear clamps 3. Therefore, no gas generated from the plate 100 to penetrate the second suction unit body 62 through the lower bowed portion 62b leaks from the second suction unit body 62 along the rotational direction of the recording drum 1.

The second suction unit body 62 has a bowed inner surface provided with neither flexed portion nor projection, so that gas readily flows along this inner surface without retention. In other words, the second suction unit 62 has no element inhibiting a gas stream. Therefore, only a small quantity of gas adheres to the inner surface of the second suction unit body 62.

The inner surface of the second suction unit body 62 is covered with a film 62c detachable from this inner surface.

The upper surface of the second suction unit 62 is supported by the pair of support arms 61 and fixed to the bearing portion 12.

The opening 64 elongated along the rotational axis 1a of the recording drum 1 is formed on the upper surface of the second suction unit body 62, as shown in FIG. 5.

The gas generated from the plate 100 may include that solidified in a jellied (greasy) or powdered state. Therefore, a jellied or powdered substance may adhere to portions exposed to the gas. The area of the opening 64 for exhausting air containing the gas from the second suction unit body 62 is so sufficiently increased that no deposit blocks the opening 64.

The second suction unit 60 further has the reducing part 65. As described later, the reducing part 65 serves as a decompression chamber reducing the speed of the gas accelerated by the rotation of the recording drum 1 to penetrate the second suction unit body 62 at a high speed. Thus, the second suction unit body 62 is prevented from simultaneous penetration of a large quantity of gas and from a state incapable of collecting the gas.

An exhaust pipe 78 is coupled to the top portion of the reducing part 65. The inner diameter of the reducing part 65 is gradually narrowed from the portion coupled to the opening 64 toward the exhaust pipe 78, as shown in FIGS. 4 and 5. Therefore, the gas hardly adheres to the inner surface of the reducing part 65. Further, the portion coupling the reducing part 65 and the exhaust pipe 78 with each other has a smoothly bowed shape provided with neither flexed portion nor projection, not to inhibit an air stream. Therefore, the gas also hardly adheres to the inner surface of the portion coupling the reducing part 65 and the exhaust pipe 78 with each other.

The exhaust pipe 78 is coupled to a second exhaust pump 81 arranged outside the housing 15 of the image recorder. The second exhaust pump 81, having a larger output than the aforementioned first exhaust pump 79, sucks gas containing the gas generated from the plate 100 through the second suction unit 60, filtrates the same through a filter 90 and thereafter discharges the same to the atmosphere. The filter 90 is detachably mounted on an exhaust port (not shown) of the second exhaust pump 81.

Figure 6A:
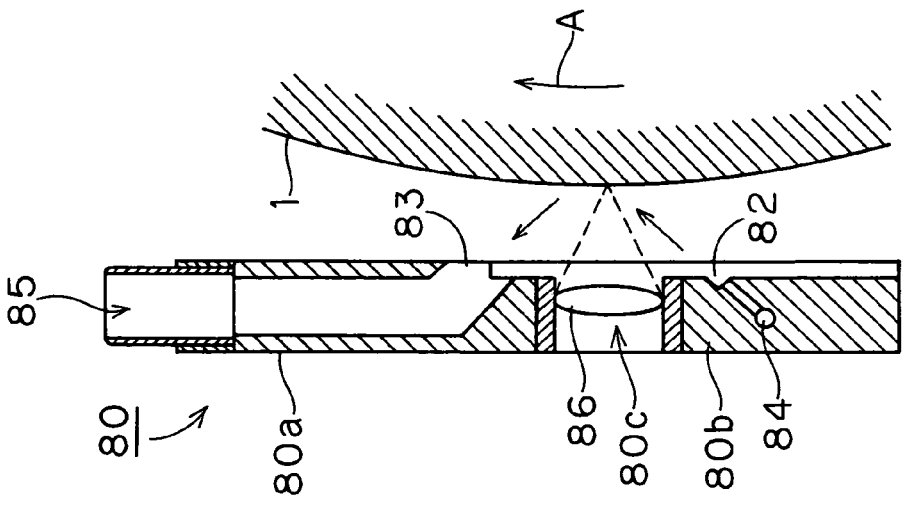
FIGS. 6A, 6B and 6C are a perspective view, a front elevational view and a longitudinal sectional view of a diffusion/suction unit respectively.
Figure 6B:
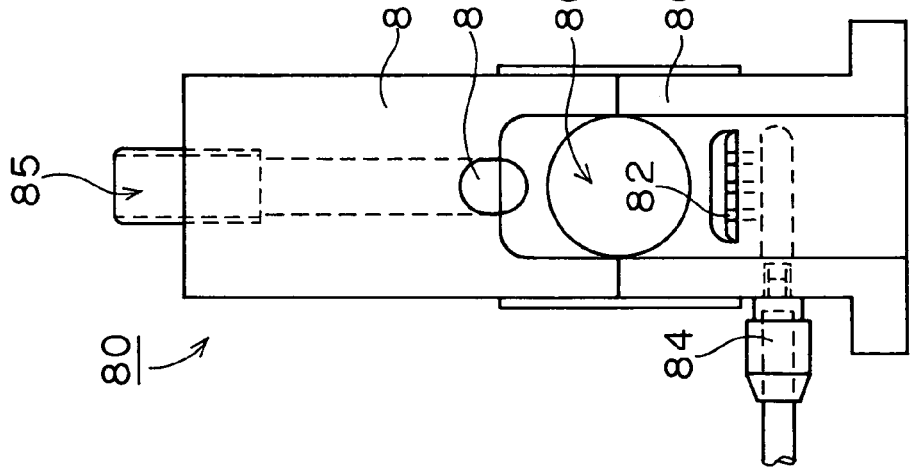
Figure 6C:
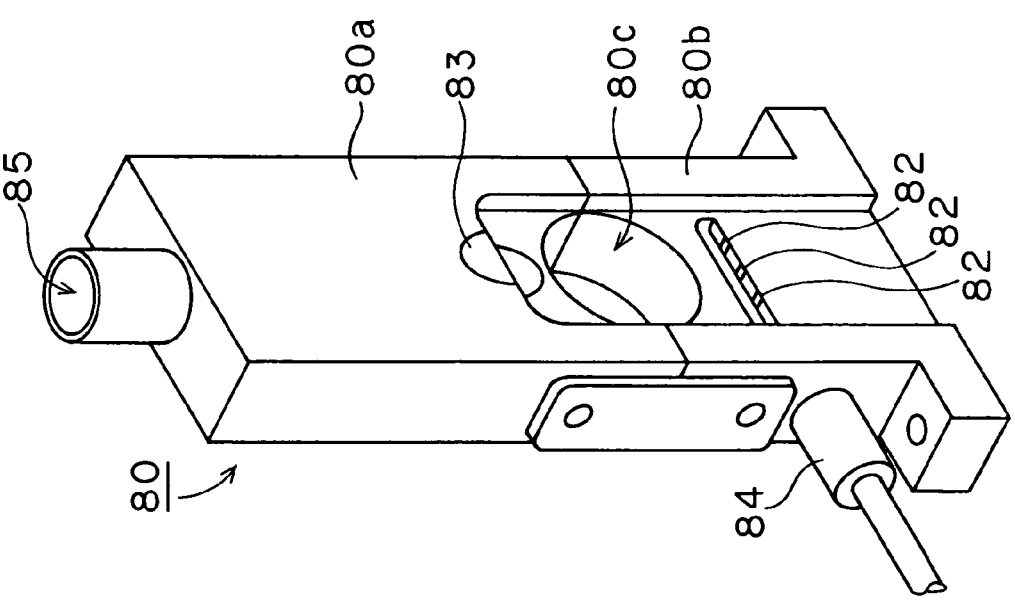

The gas diffusion/suction unit 80 is now described. FIGS. 6A, 6B and 6C are a perspective view, a front elevational view and a longitudinal sectional view showing the gas diffusion/suction unit 80 of the recording head 8 respectively.

Referring to FIGS. 6A to 6C, the gas diffusion/suction unit 80 is constituted of an upper block 80a and a lower block 80b. A circular lens hole 80c is provided on a portion coupling the upper and lower blocks 80a and 80b with each other. The objective lens 86 is mounted on this lens hole 80c. The lens hole 80c is coaxial with the laser beam emission hole 87 formed in the case 20 of the recording head 8.

The upper and lower blocks 80a and 80b are readily separable from each other. Therefore, the objective lens 86 can be simply adjusted/cleaned/exchanged.

A plurality of air injection ports 82 are provided on the front surface of the lower block 80b. The air injection ports 82 communicate with the air supply port 84 provided on a side surface of the lower block 80b. These air injection ports 82 are arranged upstream the rotational direction (along arrow A) of the recording drum 1 beyond the objective lens 86. These air injection ports 82 are substantially directed toward the position on the recording drum 1 to which the laser beam is applied through the objective lens 86. Thus, the gas diffusion/suction unit 80 diffuses the gas resulting from application of the laser beam with air and forms a substantially semicircular air curtain on the recording drum 1 which is upstream of the laser applied position in relation to the rotational direction of the recording drum 1, not to diffuse the gas generated from the plate 100 upstream the rotational direction of the recording drum 1.

A gas suction port 83 is provided on the front surface of the upper block 80a. This gas suction port 83 is arranged downstream the rotational direction (along A) of the recording drum 1 beyond the objective lens 86 substantially toward the position on the recording drum 1 to which the laser beam is applied through the objective lens 86. The gas suction port 83 communicates with the gas recovery port 85 provided on the upper surface of the upper block 80a. Thus, the gas diffusion/suction unit 80 sucks the gas resulting from application of the laser beam along with air.

Generation of the gas from the plate 100 and a state of recovering the same in image recording are now described with reference to FIG. 4.

The laser beam emitted from the recording head 8 is applied toward the plate 100 and images on an irradiation point P. The recording drum 1 mounted with the plate 100 rotates along arrow A at a high speed, whereby the gas generated from the plate 100 mainly flows downstream in relation to the rotational direction of the recording drum 1 and hardly spreads upstream. Further, the air injection ports 82 inject air toward the irradiation point P along arrow B, thereby forming the substantially semicircular air curtain about the irradiation point P upstream the rotational direction of the recording drum 1 of the irradiation point P. Thus, the gas further hardly spreads upstream the rotational direction of the recording drum 1 beyond the irradiation point P.

Most part of the gas is recovered through the gas suction port 83. If the plate 100 generates a large quantity of gas, however, the gas may not be completely recoverable through the gas suction port 83. The second suction unit 60 sucks the remaining gas for complementation of the suction through the gas suction port 83. Around the recording drum 1, the front clamps 2 form air streams C1, C2 and C3, for example, following the rotation of the recording drum 1. The second suction unit body 62, provided with the lower bowed portion 62b having the end separating from the outer peripheral surface of the recording drum 1 to some extent as described above, can efficiently recover the gas also when the air streams C1, C2 and C3 containing the gas widely spread.

When the front clamps 2 approach the second suction unit 60 due to the rotation of the recording drum 1, the second suction unit 60 must suck a large quantity of gas. In this stage, therefore, the quantity of suction of the second exhaust pump 81 is desirably increased. The second suction unit 60, having the reducing part 65 communicating with the exhaust pipe 78 with the gradually narrowed inner diameter, can smoothly guide the gas penetrating the second suction unit body 62 to the exhaust pipe 78.

After the front clamps 2 pass through the second suction unit 60, the quantity of suction of the second exhaust pump 81 is desirably reduced, so that the plate 100 is not floated up from the outer peripheral surface of the recording drum 1 due to adsorption by the second suction unit 60. When the plate 100 entirely passes through the second suction unit 60, the quantity of suction of the second exhaust pump 81 may be increased.

As hereinabove described, the end of the upper bowed portion 62a of the second suction unit body 62 is opposite to the outer peripheral surface of the recording drum 1 at a space allowing passage of the front and rear clamps 2 and 3 fixing the plate 100. The quantity of the gas flowing out from the second suction unit body 62 is reduced as this space is narrowed, preferably for gas recovery. If the space is too narrow, however, the plate 100 may be floated up as described above. Therefore, the position of the end of the bowed portion 62a is decided in consideration of the above.

The film 62c is detachably mounted on the inner surface of the second suction unit body 62, as hereinabove described. This film 62c is preferably made of a felt substance, so that the gas adhering thereto does not separate to secondarily contaminate the recording head 8 etc.

Figure 7:
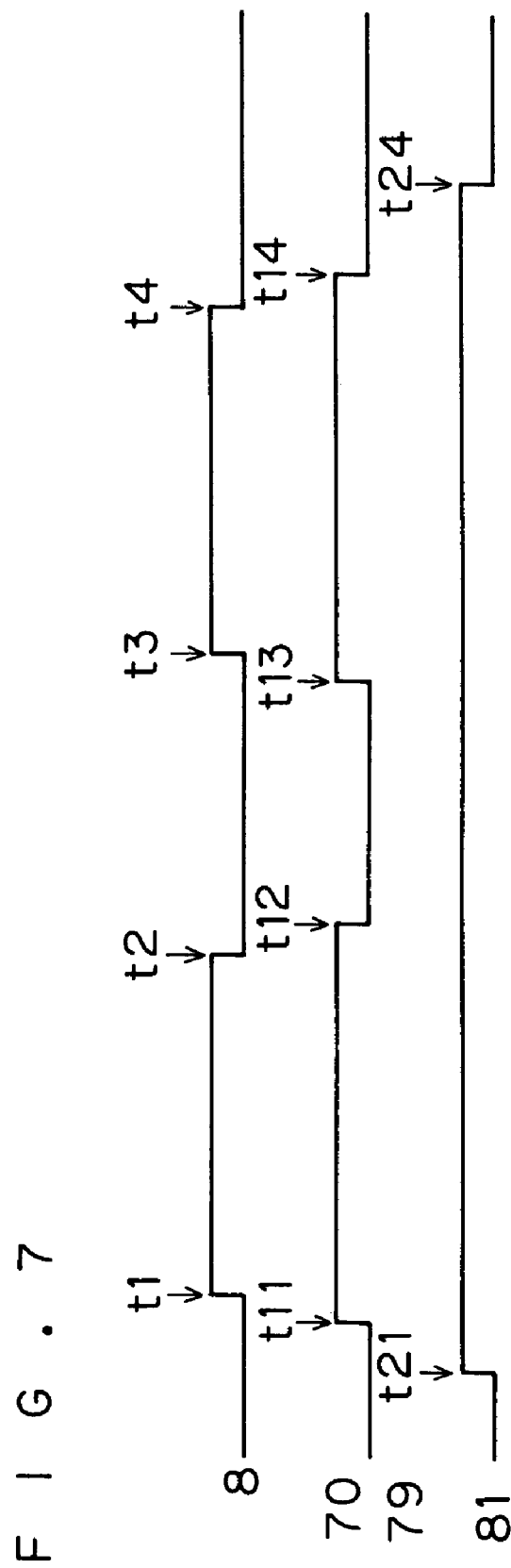
FIG. 7 is a timing chart illustrating the relation between operation timings of an air supply pump and first and second exhaust pumps and a timing for applying a laser beam from the recording head.
Figure 8:
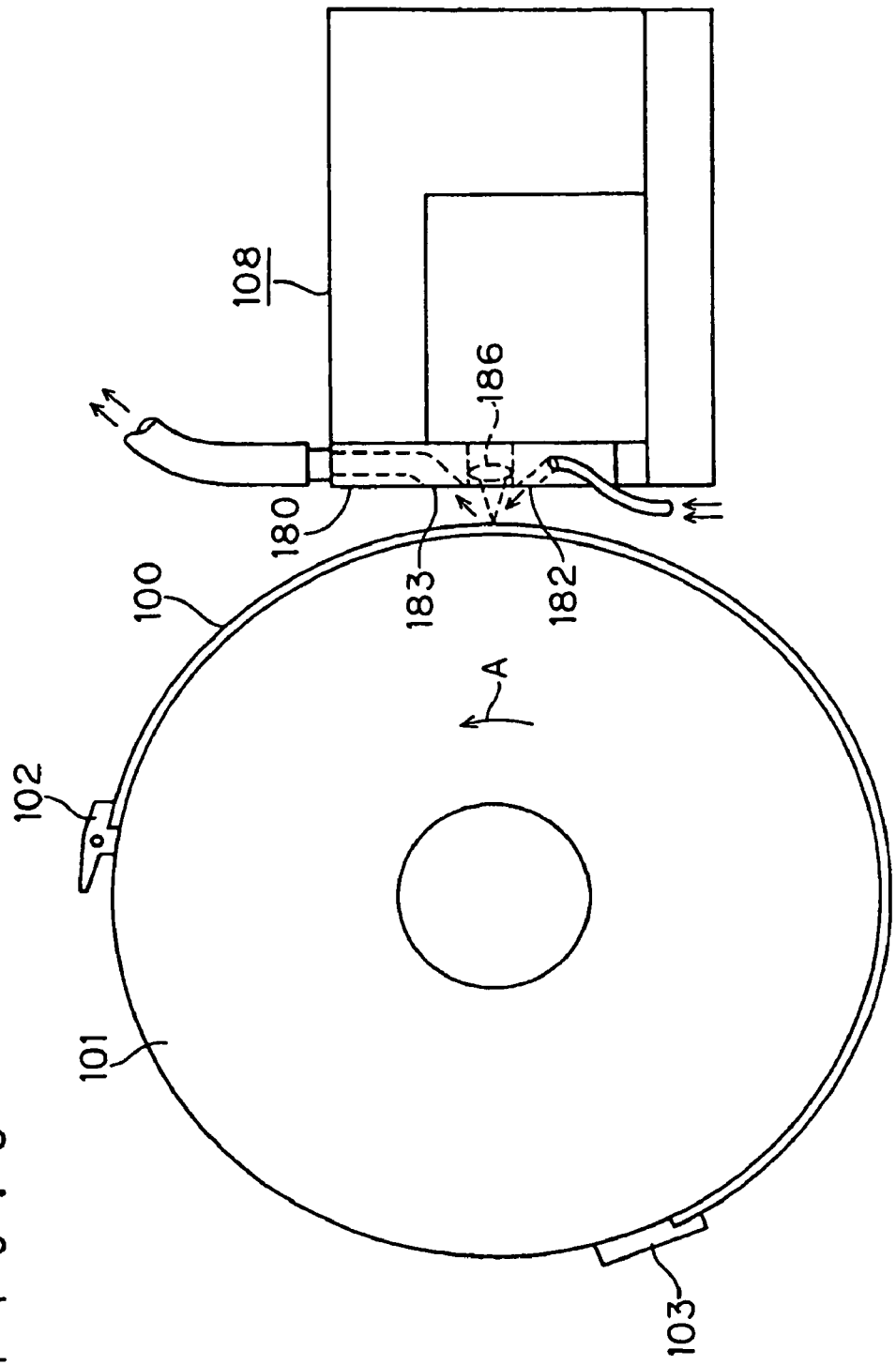
FIG. 8 is a side elevational view showing a recording drum and a recording head of a conventional image recorder.

Operation timings of the first and second exhaust pumps 79 and 81 and a timing for applying the laser beam from the recording head 8 are now described. FIG. 7 is a timing chart illustrating the relation between the operation timings of the air supply pump 70 and the first and second exhaust pumps 79 and 81 and the timing for applying the laser beam from the recording head 8.

It is assumed that the recording head 8 performs first exposure and second exposure in intervals between times t1 and t2 and between times t3 and t4 in FIG. 7 respectively. The recording head 8 performs no exposure in idle periods between times t2 and t3 and subsequent to a time t4.

The air supply pump 70 and the first exhaust pump 79 operate substantially in synchronization with the exposure timing of the aforementioned recording head 8. In other words, the air supply pump 70 and the first exhaust pump 79 start to operate from a time t11 slightly ahead (by about 1 minute, for example) of the time t1 for starting the first exposure and a time t13 slightly ahead (by about 1 minute, for example) of the time t3 for starting the second exposure respectively. The air supply pump 70 and the first exhaust pump 79 continue the operations up to a time t12 slightly subsequent (by about 1 minute, for example) to the time t2 for ending the first exposure and a time t14 slightly subsequent (by about 1 minute, for example) to the time t4 for ending the second exposure respectively.

On the other hand, the second exhaust pump 81 is so controlled as to terminate its operation not every time the recording head 8 terminates each exposure but only when the recording head 8 continuously dwells for a relatively long period (about 10 minutes). If the idle period for the exposure is relatively short (in the idle period between the times t2 and t3 between the first exposure and the second exposure, for example), therefore, the second exhaust pump 81 continuously operates, in order to entirely collect the gas generated from the plate 100 and conceivably remaining in the atmosphere of the housing 15 in an unrecovered state for a while after the exposure.

An exhaust pipe 77 of the gas diffusion/suction unit 80 communicates with the first exhaust pump 79. A filter (not shown) is interposed in the exhaust pipe 77. The gas recovered by the gas diffusion/suction unit 80 conceivably has relatively large specific gravity and contains dust or the like, and hence the filter interposed in the exhaust pipe 77 desirably has a coarse mesh. On the other hand, the gas recovered by the second suction unit 60 conceivably has relatively small specific gravity and hardly contains dust or the like, and hence the filter 90 mounted on the second exhaust pump 81 desirably has a fine mesh. The filter and the filter 90 are desirably exchangeable.

In the aforementioned embodiment, the second exhaust pump 81 discharges the gas from the housing 15 mainly through the second suction unit 60 and the exhaust pipe 78. The housing 15 is airtightly constituted for introducing outside air only through the air inlet 88. The air inlet 88 must have a sufficiently large size so that the internal pressure of the housing 15 is not remarkably reduced beyond the atmospheric pressure upon operation of the second exhaust pump 81. If the internal pressure of the housing 15 is remarkably reduced beyond the atmospheric pressure, the outside air containing foreign matter not removed through the filter 89 may penetrate the housing 15.

Thus, the image recorder according to this embodiment introduces the outside air into the housing 15 only through the air inlet 88 engaged with the filter 89 and discharges the air from the housing 15 from the second exhaust pump 81 through the filter 90. Therefore, the image recorder can keep the housing 15 clean and minimize influence on the working environment by not discharging the gas generated from the plate 100 in an untreated state.

As hereinabove described, the second suction unit body 62 is fixed to the bearing portion 12 through the pair of support arms 61 (see FIG. 3). The portions connecting the bearing portion 12 and the support arms 61 with each other are desirably separable. In this case, the second suction unit body 62 can be readily exchanged.

This is because the ability required to the second suction unit body 62 may conceivably vary with the environmental quality standard of a country or an area in which the image recorder is set or the type of the plate 100 mainly employed by the user of this image recorder.

The second suction unit body 62 is rendered so readily exchangeable that the same is readily replaced with another second suction unit body 62 upon variation of the ability required thereto.

While the invention has been shown and described in detail, the foregoing description is in all aspects illustrative and not restrictive. It is therefore understood that numerous modifications and variations can be devised without departing from the scope of the invention.

What is claimed is:

1. An image recorder applying a laser beam to an image recording material thereby recording a two-dimensional image on said image recording material, comprising:
    a recording drum having an outer peripheral surface to which said image recording material is fixed;
    a rotation element rotating said recording drum;
    a recording head having a laser beam source emitting a laser beam and an objective lens applying said laser beam to said image recording material fixed to the outer peripheral surface of said recording drum;
    a recording head moving element moving said recording head in a subscanning direction parallel to the rotational axis of said recording drum;
    a gas injection element diffusing gas generated from said image recording material irradiated with said laser beam by injecting prescribed gas in the vicinity of said objective lens, said gas injection element moving in said subscanning direction along with said recording head;
    a first suction element located downstream beyond said gas injection element in relation to the rotational direction of said recording drum for sucking said gas diffused by said gas injection element, said first suction element moving in said subscanning direction along with said recording head; and
    a second suction element located downstream beyond said first suction element in relation to the rotational direction of said recording drum for sucking said gas diffused by said gas injection element from a continuous opening over the total width of an image recording area of said image recording material in said subscanning direction.

2. The image recorder according to claim 1, further comprising an image recording material supply part supplying said image recording material to said recording drum, wherein
    said second suction element is arranged between said recording head and said image recording material supply part.

3. The image recorder according to claim 2, wherein
    said recording head has a closed case storing at least said laser beam source,
    said image recorder further comprising an element pressurizing said closed case.

4. The image recorder according to claim 1, wherein
    said second suction element has a partially cylindrical sectional shape.

5. The image recorder according to claim 4, wherein
    said second suction element comprises a first bowed portion and a second bowed portion closer to said recording head than said first bowed portion, and
    the forward end of said first bowed portion extends to a portion close to the outer peripheral surface of said recording drum beyond the forward end of said second bowed portion.

6. The image recorder according to claim 5, wherein
    said second suction element further comprises a reducing part coupling an opening formed by said first and second bowed portions and an exhaust pipe with each other, and
    the inner diameter of said reducing part is gradually narrowed from said opening toward said exhaust pipe.

7. The image recorder according to claim 6, wherein
    the inner surface of said second suction element is covered with a detachable film.

8. The image recorder according to claim 7, wherein
    the mesh of a filter interposed in an exhaust pipe of said first suction element is coarser than the mesh of another filter interposed in an exhaust pipe of said second suction element.

9. The image recorder according to claim 1, wherein
    the second suction element is detachable with respect to the recording drum.

* * * * *